(12) United States Patent
Hucker et al.

(10) Patent No.: US 11,293,640 B2
(45) Date of Patent: Apr. 5, 2022

(54) GAS TURBINE ENGINE COMBUSTOR APPARATUS

(71) Applicant: ROLLS-ROYCE plc, London (GB)

(72) Inventors: Paul A Hucker, Derby (GB); Iain Morgan, Derby (GB); Alan P Geary, Derby (GB)

(73) Assignee: ROLLS-ROYCE PLC, London (GB)

(*) Notice: Subject to any disclaimer, the term of this patent is extended or adjusted under 35 U.S.C. 154(b) by 16 days.

(21) Appl. No.: 16/819,354

(22) Filed: Mar. 16, 2020

(65) Prior Publication Data

US 2020/0309374 A1    Oct. 1, 2020

(30) Foreign Application Priority Data

Mar. 28, 2019   (GB) ...................... 1904330

(51) Int. Cl.
| | | |
|---|---|---|
| *F23R 3/28* | (2006.01) | |
| *F23R 3/00* | (2006.01) | |
| *B33Y 80/00* | (2015.01) | |

(52) U.S. Cl.
CPC ............. *F23R 3/283* (2013.01); *F23R 3/002* (2013.01); *B33Y 80/00* (2014.12); *F05D 2240/35* (2013.01); *F05D 2260/30* (2013.01); *F23R 2900/00012* (2013.01)

(58) Field of Classification Search
CPC ...................... F23R 3/283; F23R 3/002; F23R 2900/00012; F05D 2260/30; F05D 2260/38
See application file for complete search history.

(56) References Cited

U.S. PATENT DOCUMENTS

| | | |
|---|---|---|
| 7,017,350 B2 | 3/2006 | De Sousa et al. |
| 7,093,439 B2 | 8/2006 | Pacheco-Tougas et al. |
| 9,933,161 B1 | 4/2018 | Papple |
| 10,041,679 B2 | 8/2018 | Prociw |
| 10,578,021 B2 | 3/2020 | Prociw |

(Continued)

FOREIGN PATENT DOCUMENTS

| | | |
|---|---|---|
| EP | 2282121 A1 | 2/2011 |
| EP | 2 947 390 A1 | 11/2015 |
| EP | 3109548 A1 | 12/2016 |
| EP | 3109557 A2 | 12/2016 |
| EP | 3301361 A1 | 4/2018 |

(Continued)

OTHER PUBLICATIONS

Search Report of the Intellectual Property Office of the United Kingdom for GB1904330.6 with search date of Sep. 9, 2019.

(Continued)

*Primary Examiner* — Steven M Sutherland
(74) *Attorney, Agent, or Firm* — Oliff PLC (57) ABSTRACT

The present relates to combustor apparatus for a gas turbine engine comprising a bulkhead (34) an inner support ring (70) and an outer support ring (84) at end upstream end thereof. The bulkhead (34) has an inner surface (40), when in use is provided on an internal surface of a combustor (16) and exposed to combustion products and an outer surface (41) provided on an external surface of the combustor when in use; an inner mating feature to cooperate with the inner support ring (70); and an outer mating feature to cooperate with the outer support ring (84). In use, the inner and outer mating features prevent axial motion of the bulkhead relative to the inner (70) and outer (84) support rings.

17 Claims, 7 Drawing Sheets

(56) References Cited

U.S. PATENT DOCUMENTS

| | | |
|---|---|---|
| 2003/0213250 A1 | 11/2003 | Pacheco-Tougas et al. |
| 2010/0275606 A1* | 11/2010 | Holcomb ................ F23R 3/002 60/752 |
| 2013/0174562 A1* | 7/2013 | Holcomb .................. F23R 3/60 60/752 |
| 2016/0201911 A1* | 7/2016 | Chang .................... F23R 3/007 60/753 |
| 2016/0258624 A1 | 9/2016 | Harding et al. |
| 2016/0376997 A1 | 12/2016 | Prociw |
| 2016/0377292 A1 | 12/2016 | Prociw |
| 2018/0010797 A1* | 1/2018 | Marusko ................. F23R 3/002 |
| 2018/0031242 A1* | 2/2018 | Harding ................... F23R 3/60 |
| 2018/0163629 A1 | 6/2018 | Proscia |
| 2018/0224125 A1 | 8/2018 | Prociw |
| 2018/0363903 A1 | 12/2018 | Dziech |
| 2019/0072276 A1 | 3/2019 | Porter et al. |
| 2019/0242580 A1 | 8/2019 | Porter et al. |

FOREIGN PATENT DOCUMENTS

| | | |
|---|---|---|
| EP | 3453970 A2 | 3/2019 |
| EP | 3521703 A1 | 8/2019 |
| WO | 2013/147973 A1 | 10/2013 |

OTHER PUBLICATIONS

Jul. 9, 2020 extended Search Report issued in European Patent Application No. 20162630.6.

* cited by examiner

FIG. 10

GAS TURBINE ENGINE COMBUSTOR APPARATUS

CROSS-REFERENCE TO RELATED APPLICATIONS

This specification is based upon and claims the benefit of priority from UK Patent Application Number 1904330.6 filed on 28 Mar. 2019, the entire contents of which are incorporated herein by reference.

BACKGROUND

Field of the Disclosure

The present disclosure concerns combustor apparatus for a gas turbine engine.

Description of the Related Art

Figure 2:
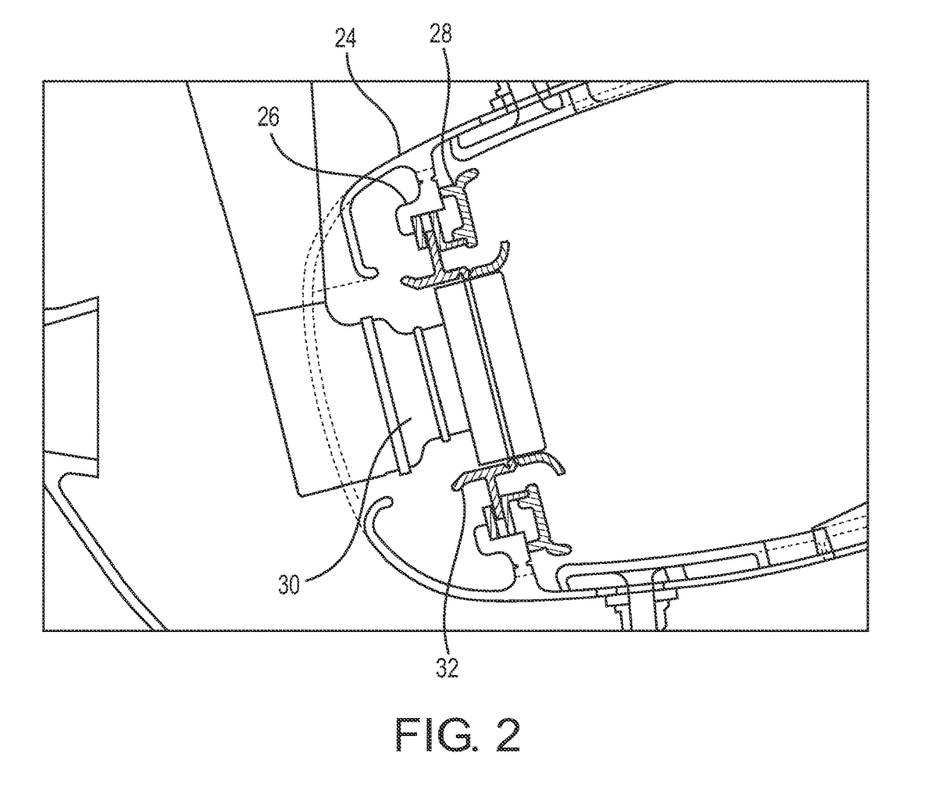
FIG. 2 is a close-up view of a known combustor in a gas turbine engine.

FIG. 2 shows a close up of the upstream end of a combustor for a gas turbine engine in a known arrangement. The combustor comprises: a liner 24 surrounding the combustor; a bulkhead 26; a head shield 28; a fuel spray nozzle 30; and a fuel spray nozzle seal 32.

The fuel spray nozzle 30 sprays fuel into the combustor. The bulkhead 26 is rigidly attached to the liner to prevent back flow of the combustion gases as fuel is injected. The bulkhead 26 comprises an aperture into which the fuel spray nozzle 30 can protrude. The fuel spray nozzle 30 comprises a seal 32 to provide a seal between the nozzle 30 and the bulkhead. The bulkhead comprises a heat shield 28. The heat shield 28 is attached to the bulkhead 26 using a plurality of threaded studs.

The fuel spray nozzle seal 32 is conventionally cast in halves, the halves being brazed together around the heat shield opening.

The bulkhead and heat shield arrangement are heavy due to the number of studs required to secure the heat shield to the bulkhead. The manufacture of the arrangement is difficult due to the complexity and size of the components, and assembly of the arrangement is also difficult due to the restricted access to the downstream side of the arrangement.

The bulkhead arrangement is also expensive due to the large forging required to produce the metering panel and the complexity of the cast heat shields.

Upon servicing of the assembly of FIG. 2, the nuts often seize and can shear the stud from the heat shield during removal due to the large temperatures experienced in use. This shortens the life of the heat shield.

It is envisaged that the temperature capability of the heat shield and associated cooling system may not meet higher temperature requirements for future gas turbine engine combustor applications.

It is an aim of the present disclosure to provide improvements generally. It is also an aim of the present disclosure to find an alternative bulkhead configuration. It may be an additional or alternative aim to find bulkhead configuration capable of meeting the temperature requirements for future gas turbine engine configurations.

SUMMARY

According to a first aspect there is provided a combustor apparatus for a gas turbine engine comprising a bulkhead, an inner support ring and an outer support ring. The apparatus may be configured to form an upstream end of a combustor. The bulkhead comprises: an inner surface provided on an internal surface of the combustor and exposed to combustion products in use; an outer surface provided on an external surface of the combustor in use. The bulkhead comprises an inner mating feature to cooperate with the inner support ring; and an outer mating feature to cooperate with the outer support ring. In use, the inner and outer mating features prevent axial motion of the bulkhead relative to the inner and outer support rings.

The inner surface and the outer surface of the bulkhead may be either or both of integrally and monolithically formed, e.g. as opposing surfaces of a single-layer wall structure.

Either or both of the inner mating feature and the outer mating feature may be configured to permit radial expansion or contraction of the bulkhead relative to the support rings.

Either or both of the inner mating feature and the outer mating feature may be aligned in the radial direction. Either or both of the inner mating feature and the outer mating feature may be positioned radially inwards or radially outwards of the body of the bulkhead.

Either or both of the inner mating feature and the outer mating feature may comprise one or more of a projection, recess, or wall. The projection, recess, or wall, may extend in the radial direction.

The inner support ring may comprise a cooperating mating feature to cooperate with the inner mating feature of the bulkhead.

The outer support ring may comprise a cooperating mating feature to cooperate with the outer mating feature of the bulkhead.

The inner support ring may comprise a second mating feature to cooperate with a combustor inner liner.

The outer support ring may comprise a second mating feature to cooperate with a combustor outer liner.

The combustor apparatus may further comprise a lock ring.

Either or both of the cooperating mating feature of the inner support ring and the outer support ring may comprise a first wall, and in use, the first wall may combine with a wall of the lock ring to form a recess therebetween. The recess may cooperate with the inner or the outer mating feature of the bulkhead to prevent axial movement of the bulkhead and optionally permit radial expansion thereof. In embodiments, the combustor apparatus may comprise a single lock ring which cooperates with a support ring to form a recess for the outer mating feature of the bulkhead, the inner or outer mating feature of the bulkhead being a projection to cooperate with the recess.

The outer mating feature of the bulkhead may comprise a projection; the outer support ring may comprise a first wall and may form a recess in combination with a wall of a locking ring to accommodate the projection of the outer mating feature.

In use the inner support ring may be located radially inwards of bulkhead. In use either or both of the outer support ring and outer support ring may be located radially outwards of bulkhead.

The inner and outer support rings may be continuous annular structures configured to carry hoop stresses.

The inner support ring may comprise a projection; the inner mating feature of the bulkhead may comprise a recess.

The inner support ring may comprise a second mating feature to connect with the combustor inner liner. The second mating feature of the inner support ring may comprise a projection. The projection may extend in substantially the axial direction into a corresponding recess of the combustor inner liner. The combustor inner liner may comprise a recess to accommodate the projection of the inner support ring. Alternatively, the second mating feature of the inner support ring may comprise a recess and the combustor inner liner may comprise a projection.

The outer support ring may comprise a second mating feature to cooperate with the combustor outer liner. The second mating feature of the outer support ring may comprise a projection. The projection may extend substantially in the axial direction into a corresponding recess of the combustor outer liner. The combustion outer liner may comprise a recess to accommodate the projection of the outer support ring. Alternatively, the second mating feature of the outer support ring may comprise a recess and the combustor outer liner may comprise a projection.

The inner support ring and outer support ring may provide resistance to hoop stresses for the combustor apparatus where either or both of the bulkhead and combustor liners may comprise a plurality of segments.

Any of the inner support ring, outer support ring, bulkhead, lock ring, cowl, combustor inner liner or combustor outer liner may comprise a joining feature. The joining feature of any of the outer support ring, the cowl, the combustor outer liner or the lock ring may extend radially outwards from the outer circumference of either of these components. The joining feature of any of the inner support ring, the combustor inner liner or the inner lock ring may extend radially inwards from the inner circumference of either of these components. The joining feature is for a mechanical connection between components. The joining feature may comprise a boss or lug adapted to receive a fastening device or may comprise an integrated fastening device. The joining feature may be configured to receive a fastening device so that the fastening device is aligned in the axial direction. The fastening device may comprise a screw or bolt.

In embodiments, the combustor apparatus may be configured to be assembled so that the outer support ring is axially upstream of and connected to the combustor outer liner; and is radially outwards of and connected to the bulkhead; axially downstream of and connected to the lock ring; the lock ring axially downstream of and connected to a cowl. In embodiments, the combustor apparatus may be configured to be assembled so that the inner support ring is axially upstream of and connected to the combustor inner liner; and radially inwards of and connected to the bulkhead.

The bulkhead may comprise one or more aperture for reception of a fuel spray nozzle. The bulkhead may serve as a metering panel. The bulkhead may serve as a combined metering panel and heat shield, e.g. in a singular wall structure.

The bulkhead may comprise a fuel spray nozzle seal. The seal may be provided within the aperture for reception of a fuel spray nozzle. The seal may be annular, e.g. extending around the aperture circumference.

The bulkhead may comprise or consist of a nickel alloy.

The bulkhead may comprise or consist of a composite metal ceramic.

The seal may be integrally formed with, or affixed to, the bulkhead.

The bulkhead may comprise a plurality of annular segments, e.g. a plurality of annular segments arranged in a common plane. The plurality of annular segments may be arranged as an annular ring. The annular segments may be arranged in a single layer.

The plurality of annular segments may each comprise an inner mating feature and an outer mating feature. The inner and outer mating features of the plurality of annular segments may be continuous between adjacent annular segments e.g. a plurality of annular segments may comprise a wall, recess or projection that is unbroken when adjacent annular segments are aligned.

The or each annular segment may comprise a plurality of seals. Each annular segment may comprise a spray nozzle seal, and either or both of a plurality of spray nozzle seals and an edge seal for sealing against an adjacent seal.

The inner support ring may be configured to engage the bulkhead and an inner liner of the combustor to provide a seal therebetween.

The outer support ring may be configured to engage the bulkhead and an outer liner of the combustor to provide a seal therebetween.

The combustor apparatus may additionally comprise a combustor inner liner; a lock ring; and either or both of a combustor outer liner and a cowl. The combustor apparatus may be assembled to form a combustion chamber of a combustor.

The combustor apparatus may comprise a locking ring, e.g. the locking ring configured to engage the bulkhead and the outer support ring to provide a seal therebetween.

A gas turbine engine may comprise either or both of the bulkhead and the combustor apparatus of any aspect or embodiment described herein.

According to a further aspect there is provided a method of manufacturing the bulkhead or combustor apparatus of any preceding aspect, comprising using an additive layer manufacturing process. The method may comprise selective laser sintering.

According to a further aspect, there is provided a method of manufacturing the bulkhead or combustor apparatus of any preceding aspect, comprising forming the bulkhead having a plurality of fixing formations for assembly of the bulkhead as a singular end wall structure to a combustor, e.g. to either or both of a combustor lining and side walls.

According to a further aspect, there is provided a method of assembling the combustion apparatus.

The skilled person will appreciate that except where mutually exclusive, a feature described in relation to any one of the above aspects may be applied mutatis mutandis to any other aspect. Furthermore, except where mutually exclusive any feature described herein may be either or both of applied to any aspect and combined with any other feature described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
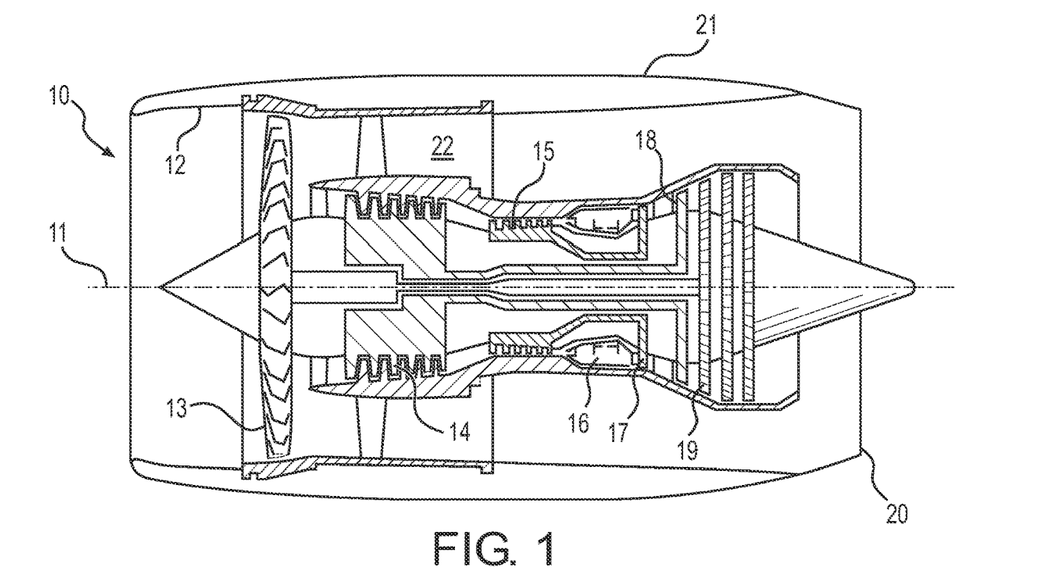
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high-pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high-pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 3:
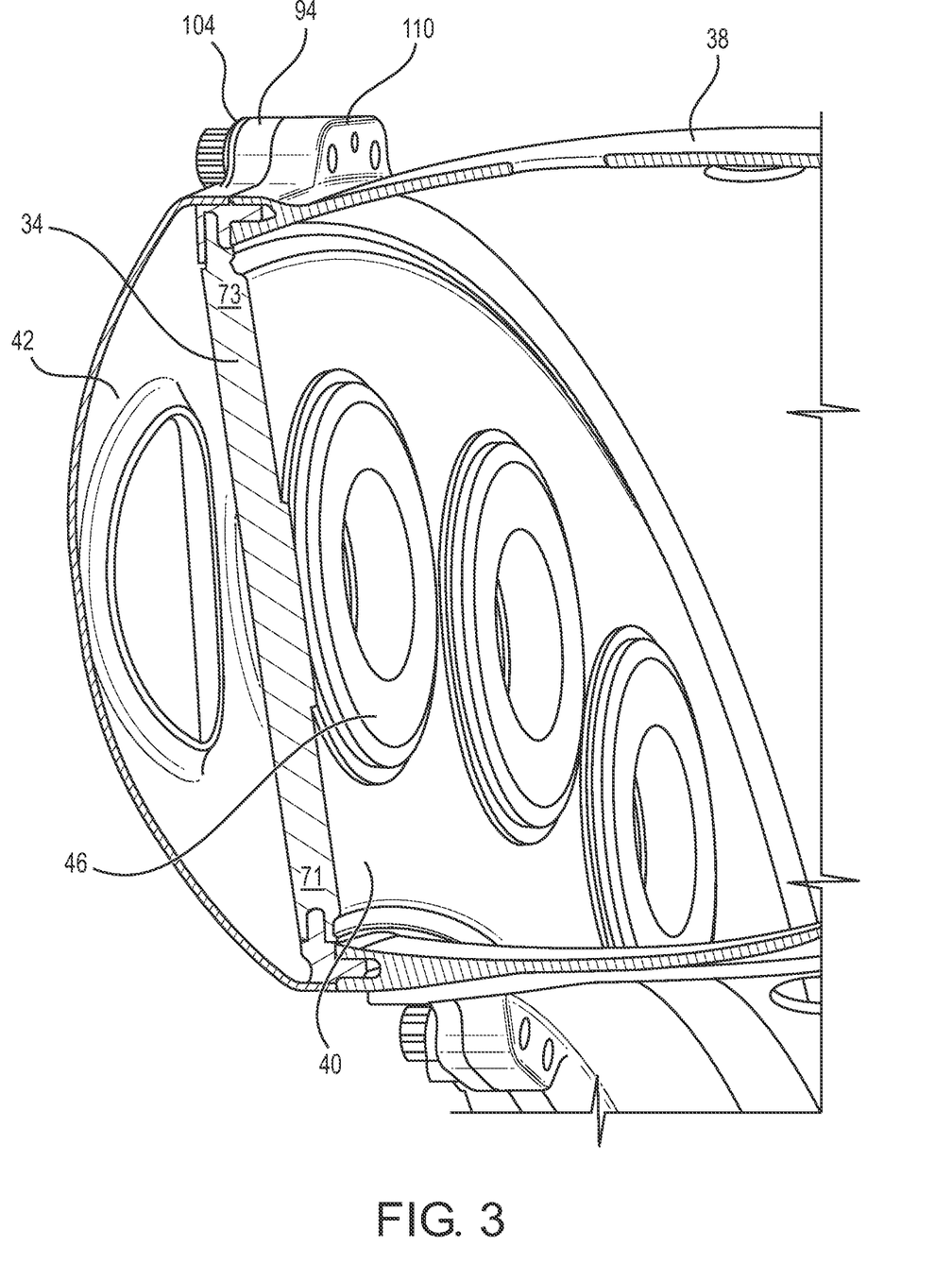
FIGS. 3 and 4 are close up three-dimensional views of different sections through a combustor in a gas turbine engine.
Figure 4:
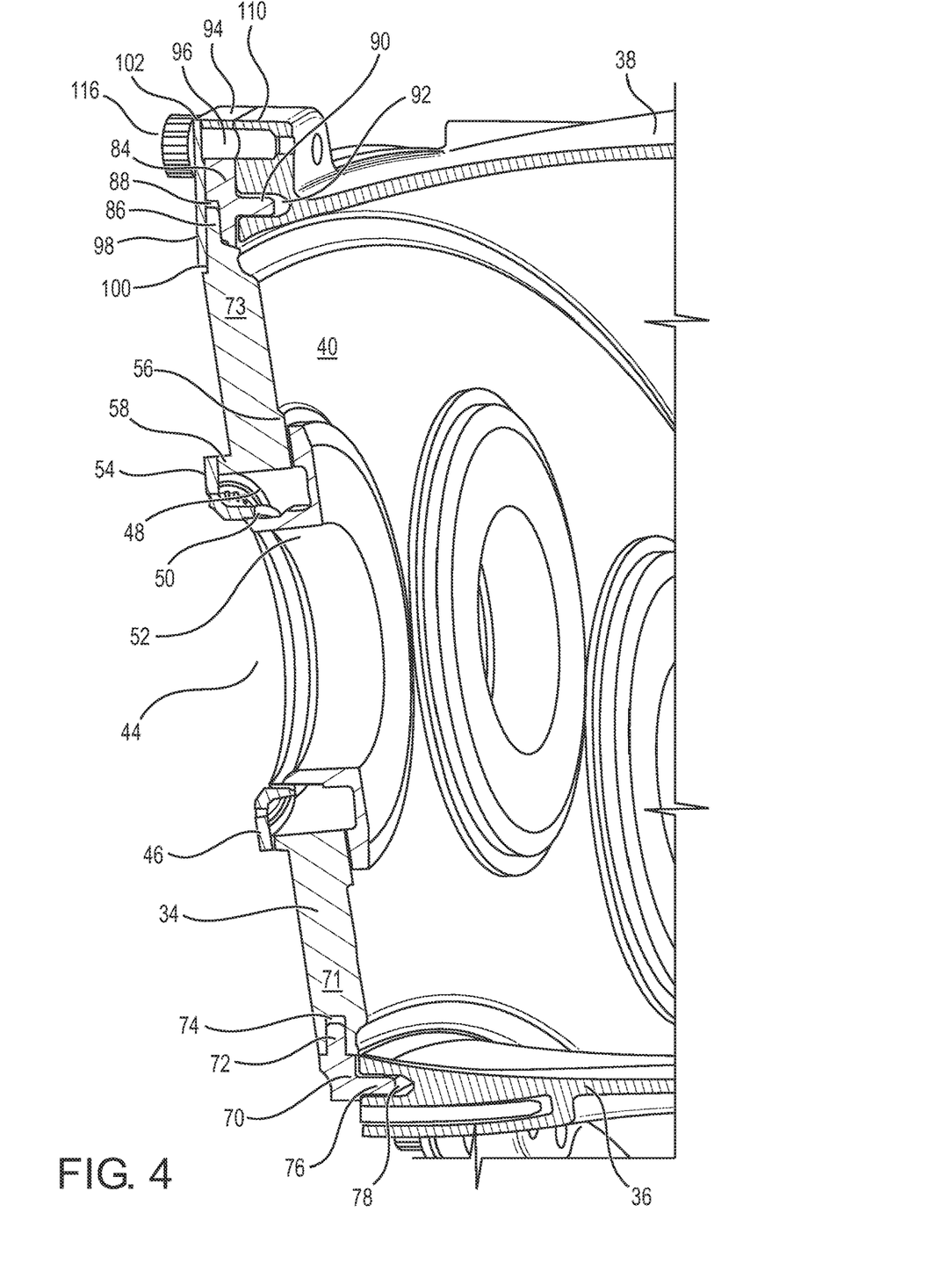

FIGS. 3 and 4 show a close up for the upstream end of a combustion system 16, or combustor, of a gas turbine engine.

A bulkhead 34 extends between first liner 36 and a second liner 38 of the combustor 16 at the upstream end of the combustor 16. The bulkhead comprises an inner surface 40, forming an internal surface within the combustor 16. The internal surface 40 is exposed to the combustion gas formed within the combustor 16 in use.

The bulkhead 34 prevents release of the combustion gas from within the combustor. The bulkhead may be defined as providing an end plate or end face of the combustor.

The bulkhead 34 comprises an inner mating feature 74 to connect to a cooperating mating feature 72 on an inner support ring 70. The bulkhead 34 also comprises an outer mating feature 86 to connect to a cooperating mating feature 88 on an outer support ring 84.

The first liner 36 and second liner 38 define opposing side walls of the combustor and, in this example represent inner and outer liners respectively. The first liner 36 may be a radially inner liner and the second liner 38 may be a radially outer liner, i.e. of annular combustor arrangement. The first and second liner extend in a generally axial direction such that the bulkhead is obliquely or perpendicularly angled thereto so as to span the radial height of the combustor between the inner and outer liner.

The bulkhead 34 comprises an outer surface 41 (see FIG. 6) forming an external surface of the combustor 16. The outer surface 41 in normal operation is not exposed to combustion gases. A significant temperature gradient thus exists between the inner and outer surfaces in use.

The bulkhead 34 currently embodied in FIG. 2 comprises a unitary or monolithic piece of material, such that that inner surface 40 and the outer surface 41 are integrally formed. The bulkhead 34 may comprise or consist of a single wall structure, alternatively, in some embodiments, the bulkhead may comprise adjacent/overlying walls of the heat shield and metering panel of the prior art. According to various embodiments of the disclosure, the bulkhead may be defined as providing the combined functionality of a heat shield and metering panel in singular, single layer and/or unitary bulkhead wall structure.

The bulkhead 34 may comprise a metallic material. The metallic material may comprise a Nickel alloy. The metallic material may comprise a high temperature Nickel alloy. The metallic material may comprise a Nickel-based superalloy.

The bulkhead 34 may comprise a Ceramic Matrix Composite (CMC). The Ceramic Metal Composite may comprise one or more of: alumina, carbon, silicon carbide or fibres thereof.

The bulkhead 34 may be manufactured using an Additive Layer Manufacturing (ALM) technique. The Additive Layer Manufacturing technique may be Selective Laser Sintering (SLS), binder jet additive layer manufacturing or other relevant ALM techniques.

The bulkhead 34 may be manufactured by metal injection moulding or casting, for example. An isostatic pressing process may be used to consolidate the bulkhead. In particular, hot isostatic pressing may be used on a bulkhead made by ALM or metal injection moulding. In the example of a CMC bulkhead, a sintering process may be used to form the bulkhead.

The bulkhead 34 is manufactured to form a single unitary or monolithic piece.

The bulkhead 34 comprises at least one aperture 44 which houses a fuel spray nozzle in use. The aperture 44 may be located in a central portion of the bulkhead 34, e.g. spaced from the inner and outer edge of the bulkhead and/or spaced from the inner 36 and outer 38 liner.

A fuel spray nozzle seal 46 is located within the bulkhead aperture. In use, the seal 46 is provided between the fuel spray nozzle and the bulkhead 34 to provide a seal therebetween.

The seal 46 comprises an annular ring arranged to be seated within the bulkhead aperture 44.

The ring comprises a cavity 48 on an outer edge of the ring, i.e. a peripheral or circumferential cavity/channel, which is arranged to be received by the edge of the bulkhead defining/around the aperture 44. The depth of the cavity 48 is such that it is only partially penetrated by the bulkhead 34. The bulkhead 34 may only partially penetrate each cavity 48 such that a gap is left between the bulkhead 34 and an inner/intermediate portion or wall 50 of the seal 46, e.g. to permit lateral movement of the seal 46 with respect to the bulkhead 34. The gap may have a height in the radial direction relative to the aperture 44. That is to say a base of the cavity 48 may have a smaller radius than radius of the aperture 44.

The seal 46 may comprise a first portion 52 and a second portion 54, e.g. opposing portions of halves of the seal. Each of the first and second portions of the seal are annular in form. The first portion may be seated on the inner surface 40 of the bulkhead, whereas the opposing, second portion 54 may be seated on the outer surface 41.

The intermediate wall 50 of the seal extends through the wall thickness of the bulkhead so as to join the annular first and second portions together, thereby retaining the seal 46 in the aperture 44. The intermediate wall 50 is formed by an inner wall of the first portion 52 and/or an inner wall of the second portion 54. In the example shown, respective inner walls of the first and second portions overlap to form a seal therebetween.

The first portion 52 and a second portion 54 may be brazed together, e.g. at the intermediate wall 50.

The first portion 52 may at least partially overlay a corresponding annular protrusion or lip 56 provided on the inner surface 40 of the bulkhead 34, i.e. extending around the aperture 44. The lip 56 forms a raised rim formation upon which the first portion is mounted.

The second portion 54 may at least partially overlay a corresponding annular protrusion or lip 58 provided on the outer surface of the bulkhead 34, i.e. extending around the aperture 44. The lip 58 is deeper than the lip 56 and defines a shoulder formation against which the annular second portion 54 sits when assembled.

The second portion 54 comprises a plurality of cooling channels 58 that open into the cavity 48. The cooling channels 58 may be disposed circumferentially around the second portion 54, e.g. to define an annular/circumferential array of openings.

In one embodiment, the seal 46 is formed integrally with the bulkhead 34, e.g. during an Additive Layer Manufacturing process.

The inner surface 40 of the bulkhead 34 may comprise a surface coating. The surface coating may comprise a thermal barrier coating. The thermal barrier coating may comprise a ceramic material, for example, the ceramic material may comprise zirconia or stabilised zirconia. The thermal barrier coating may be provided by plasma spraying, physical vapour deposition, e.g. electron beam physical vapour deposition, or chemical vapour deposition.

A bond coating may be provided before the thermal barrier coating. The bond coating may comprise a MCrAlY coating, where M is one or more of nickel, cobalt and iron, or an aluminide coating, e.g. a simple aluminide, a chromium aluminide, a platinum aluminide, platinum chromium aluminide or a silicide aluminide. The bond coating may comprise a nickel or cobalt coating, in embodiments, the bond coating may comprise pure Nickel.

The coating (i.e. bond coating or thermal barrier coating) is bonded/fused with the bulkhead surface such that it is not mechanically separable therefrom, i.e. without damage to the bulkhead. As such the coating and bulkhead body form a unitary member or wall, which may be described herein as an integral or monolithic body/surface. The bulkhead and coating can be mounted in the combustor assembly as a singular wall unlike the separate bulkhead and heat shield components of the prior art.

The bulkhead 34 comprises at least one cooling channel. The bulkhead may comprise a plurality of cooling channels. The cooling channels extend between the inner surface 40 and the outer surface 41 of the bulkhead 34. The cooling channels may be formed in the bulkhead 34 during the Additive Layer Manufacturing process.

Alternatively, the channels may be formed using a reductive process on the pre-formed bulkhead. The reductive process may comprise laser drilling or electron beam drilling. The reductive process may comprise mechanical drilling.

The cooling channels may provide effusion cooling. The cooling channels may be angled with respect to the inner surface 40 and/or the outer surface 41. The angle may be between 10 and 20 degrees. The cooling channels may increase in cross-sectional area toward the outer surface. The cooling channels may be U-shaped.

The bulkhead 34 may comprise a substantially uniform thickness.

Alternatively, the bulkhead 34 may comprise a varying thickness. The bulkhead may have an increased thickness at a first side 71, e.g. towards an edge adjoining liner 36 in use. The bulkhead may have an increased thickness at a second side 73, e.g. towards an edge adjoining liner 36 in use. The bulkhead may thus be tapered or of lesser/reduced wall thickness towards its central region.

The inner surface 40 may be non-flat to accommodate a varying thickness. The inner surface 40 may comprise a curved surface to provide an increased thickness at the first 71 and/or the second 73 side/edge. The inner surface 40 may comprise a V-shaped surface to provide an increased thickness at the first end 71 and/or the second end 73.

The bulkhead 34 could comprise a substantially flat or uniform cross-section extending between the inner liner 36 and the outer liner 38.

Alternatively, the bulkhead 34 may comprise a non-flat cross-section. The bulkhead 34 may comprise a curved cross-section. The apex of the curve may extend towards an upstream or a downstream end of the combustor 16. The bulkhead 34 may comprise a v-shaped cross-section. The apex of the V-shape may extend towards an upstream or a downstream end of the combustor 16.

The combustion apparatus may comprise a cowl 42, i.e. on or over the outer surface 41 of the bulkhead. The cowl 42 is shaped to direct air flowing from a high-pressure compressor 15 outlet to the outer surfaces of the combustor in use (i.e. the outside surfaces of the inner liner 36 and the outside surfaces of the outer liner 38). The outer surface 41 and/or cowl 42 may comprise a curved/domed surface. The apex of the curve may extend in an upstream direction of the combustor 16. The outer surface 41 may comprise a v-shaped surface. The apex of the V-shape may extend in an upstream direction of the combustor 16.

Figure 5:
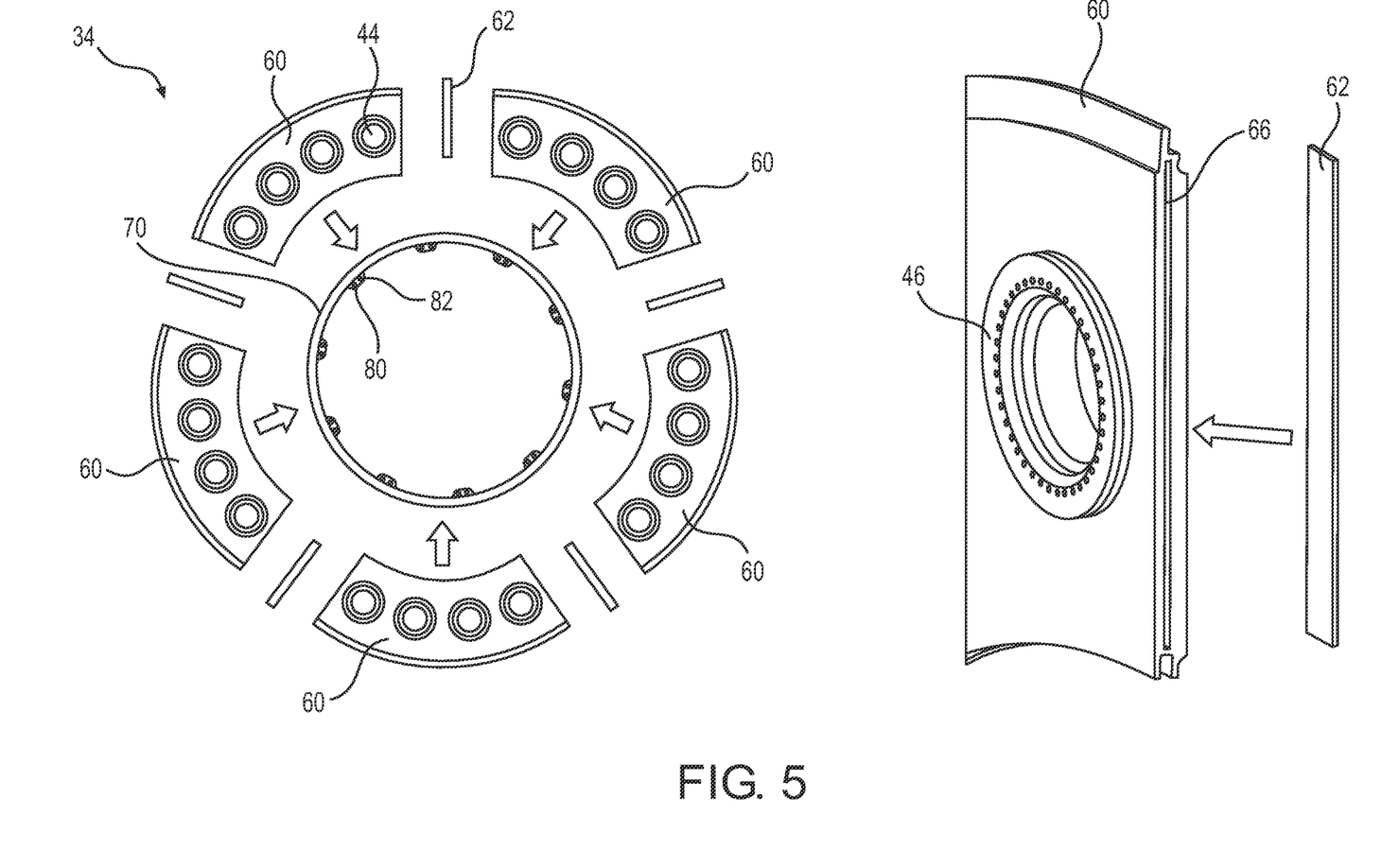
FIG. 5 shows an exploded plan view of a bulkhead and an enlarged three-dimensional view of a segment thereof.

Referring to FIG. 5, the bulkhead 34 may be annular in form. The bulkhead may comprise a single annular piece.

Alternatively, the bulkhead 34 may comprise a plurality of annular segments 60 which may combine to form an annulus. The bulkhead 34 may comprise between one and twenty segments 60, or between two and ten segments. The bulkhead 34 may comprise between four and six or eight segments 60. The bulkhead may comprise a range of segments formed from any of the aforesaid endpoints. The bulkhead 34 in this example comprises five segments 60.

Each segment 60 may comprise a single aperture 44 for each respective fuel spray nozzle and seal 46. Each segment 60 may comprise a plurality of apertures 44. Each segment may comprise an integer or non-integer number of apertures 44. Each segment may comprise between one and ten apertures 44. Each segment may comprise between two and six apertures 44. Each segment comprises four apertures 44 in this example.

Adjacent segments 60 may be sealed, e.g. along adjoining edges, using seal strips 62 to prevent release of combustion gases from the combustor 16. All the segments 60 may be sealed together to form an annular bulkhead 34.

The seal strip 62 may be formed as a separate component from the bulkhead 34. The seal strip 62 is located in a groove 64 formed on an edge 66 of a segment 60 in this example. An adjacent segment 60 comprises a groove on a corresponding/opposing edge 68. The segments 60 are brought together to seal the seal strip 62 there-between.

Alternatively, the seal strip 62 is formed integrally with, or attached to, the bulkhead segments 60. The seal strip 62 may be formed during the Additive Layer Manufacturing process of manufacturing the bulkhead 34. The seal strip 62 may be integrally formed on the bulkhead 34 in a subsequent Additive Layer Manufacturing process after the bulkhead 34 has been manufactured using a first Additive Layer Manufacturing process. Each segment 60 may comprise a single integral seal along an edge of the segment. Alternatively, a first set of segments comprises two integral seals along two edge of the segment, and the second set of segments comprises only corresponding grooves.

Figure 6:
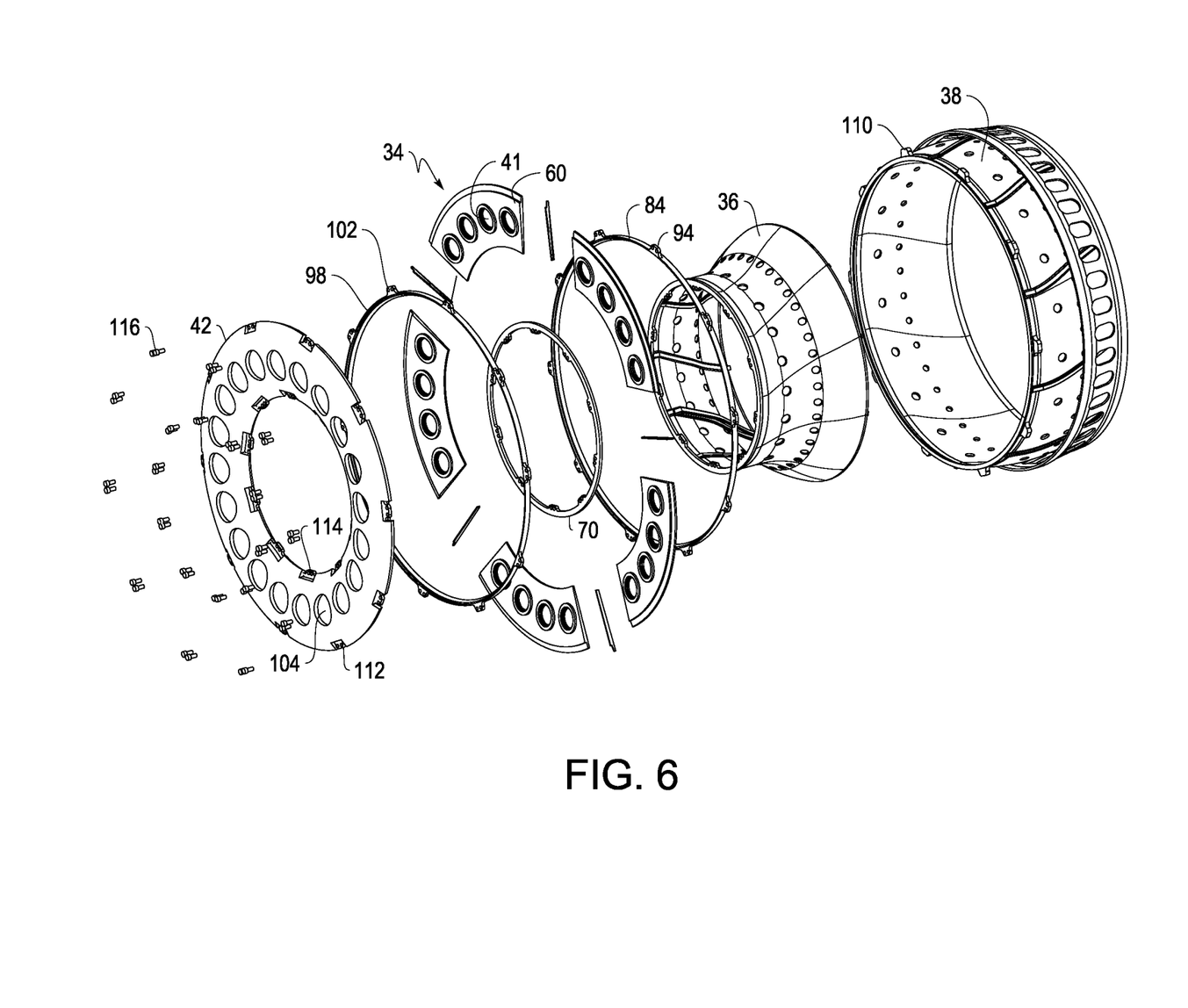
FIG. 6 is an exploded view of a combustor assembly.
Figure 7:
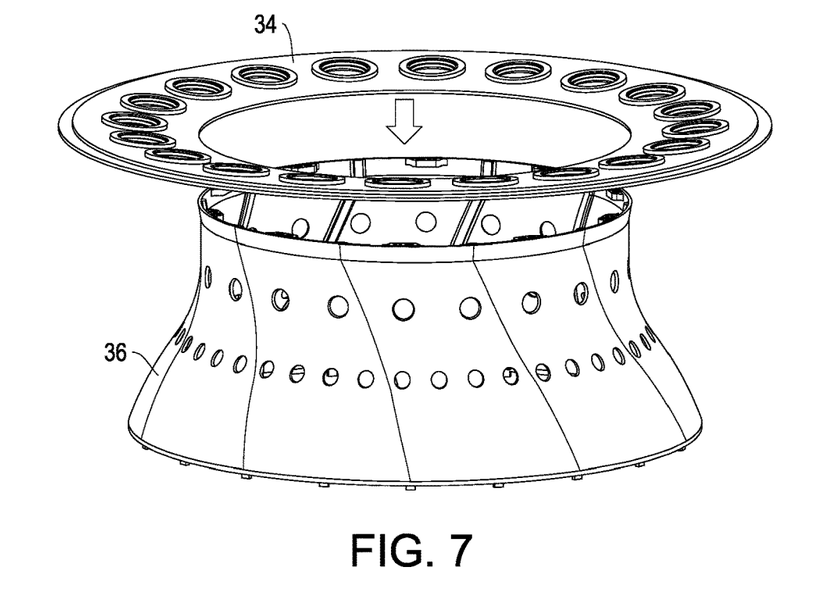
FIGS. 7-10 show three-dimensional views of a combustor assembly during different stages of an assembly process.
Figure 8:
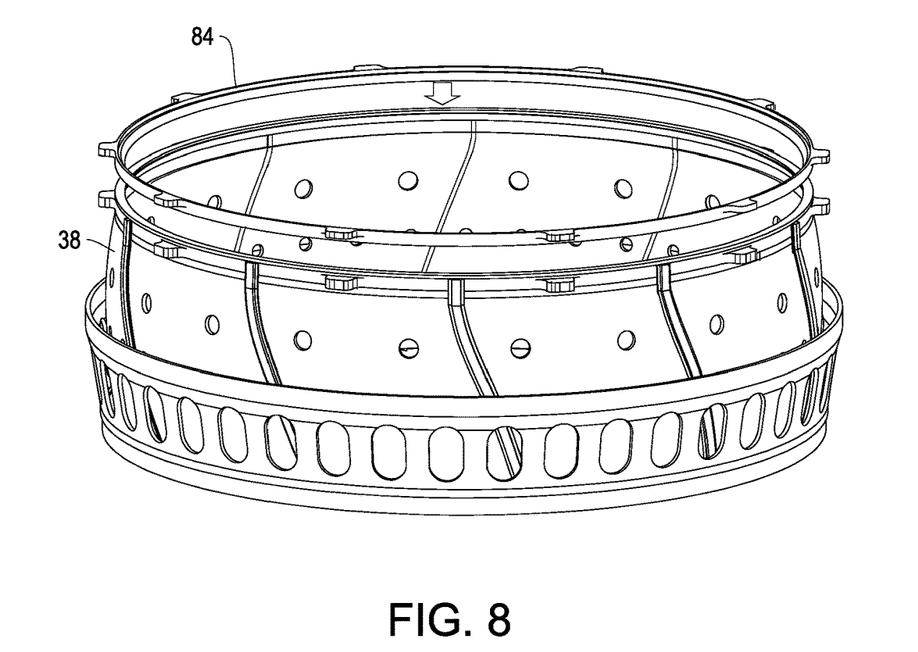
Figure 9:
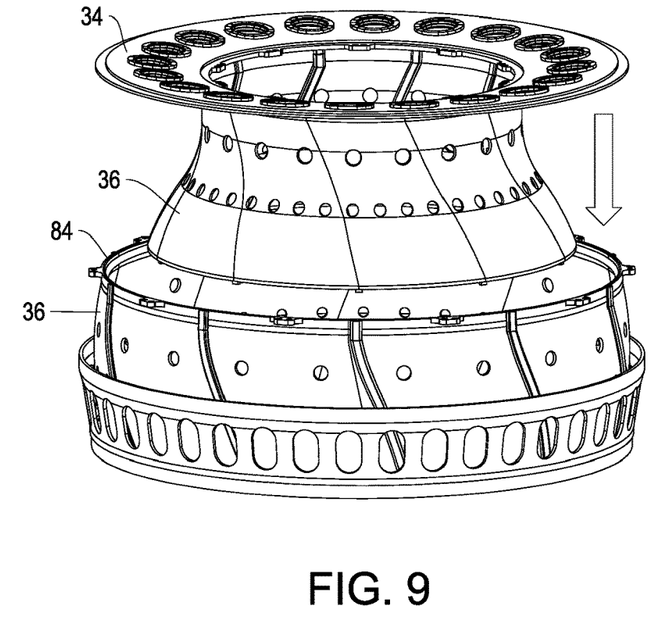
Figure 10:
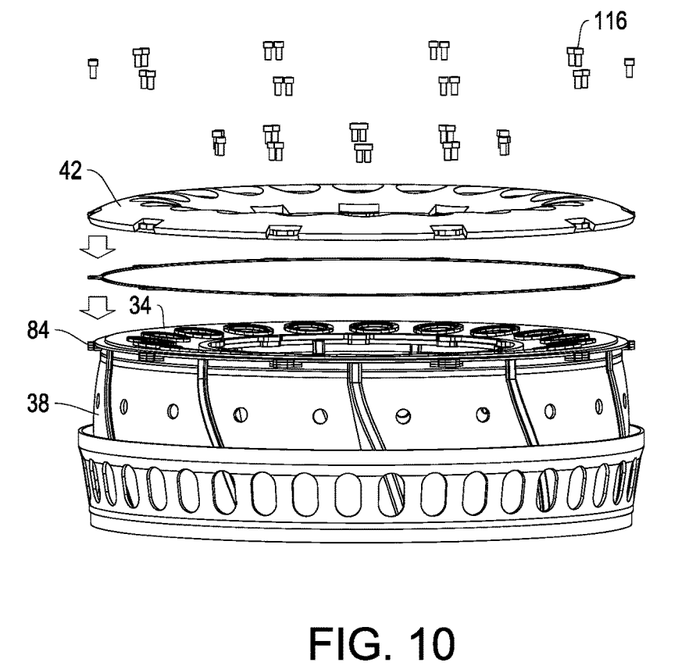

Referring to FIGS. 4 to 6, the combustion apparatus comprises an inner support ring 70. The inner support ring 70 engages the bulkhead 34 at the first edge/side 71 thereof and the inner liner 36 to form a seal therebetween. The inner support ring 70 is annular.

The inner support ring 70 comprises a cooperating mating feature 72 to cooperate with an inner mating feature 74 of the bulkhead 34. The inner mating feature of the bulkhead 34 may comprise a protrusion or recess. The cooperating mating feature 72 of the inner support ring 70 may comprise a wall or recess to accommodate a protrusion, or may comprise a protrusion to be accommodated in a recess of the bulkhead 34.

In the inner support ring 70 exemplified herein, the cooperating mating feature 72 of the inner support ring 70 comprises a first protrusion. The first protrusion extends towards and engages the inner mating feature 74, e.g. a cavity or recess in the bulkhead 34. The first protrusion may comprise a continuous annular ridge. The first protrusion may comprise a plurality of discrete protrusions. The cooperating mating feature 72 may be angled toward the downstream end of the combustor 16. The cooperating mating feature 72 may be angled toward the upstream end of the combustor 16. The cooperating mating feature 72 may be angled in the radial direction and/or parallel to the plane defined by the body of the bulkhead, this may help permit lateral relative movement of the bulkhead 34 and the inner support ring 70.

The first protrusion may only partially occupy the cavity 74 on the bulkhead 34, this may also help permit lateral relative movement of the bulkhead 34 and the inner support ring 70.

In some embodiments, the cooperating mating feature 72 of the inner support ring 70 may comprise a recess instead of a first protrusion, or a combination of recesses and protrusions. The cooperating mating feature 72 of the inner support ring 70 may be continuous around the outer circumference of the inner support ring 70 or it may comprise a plurality of discrete recesses and/or discrete protrusions around the outer circumference of the inner support ring 70. Alternatively, the cooperating mating feature 72 of the inner support ring 70 may comprise a wall to prevent downstream axial motion of the bulkhead 34 and an inner locking ring (not shown) may be retained against the inner support ring 70 and/or the inner liner 36 to provide a second wall to prevent upstream axial motion of the bulkhead 34.

The inner support ring 70 comprises a second mating feature 76. In FIG. 4 this is shown as a protrusion. The second mating feature 76 may comprise a cavity (i.e. a recess) or a protrusion. In embodiments where the second mating feature 76 is a protrusion, the protrusion extends towards and engages a corresponding cavity 78 on the inner liner 36. The second protrusion may comprise a continuous annular ridge. The second protrusion may comprise a plurality of discrete protrusions. The second protrusion may extend perpendicularly to the first protrusion 72, or else an oblique angle thereto, i.e. offset from perpendicular. In embodiments where the second mating feature 76 is a cavity, the inner liner 36 may comprise a protrusion to cooperate with the cavity on the inner support ring 70. In embodiments the inner liner 36 and the inner support ring 70 may both comprise cooperating protrusions and cavities.

The second mating feature 76 may be axially aligned with the corresponding mating feature of the inner liner 36. This may improve ease of assembly.

The second protrusion may only partially occupy the cavity 78 on the inner liner 36 to permit axial relative movement of the inner liner 36 and the inner support ring 70.

Likewise, in embodiments where the second mating feature 76 is a cavity, a corresponding protrusion of the inner liner may only partially occupy a cavity on the inner support ring 70.

The inner support ring 70 comprises a plurality of the joining features 80. The joining features extend towards a centre point of the inner support ring 70. The joining features 80 comprise at least one aperture 82 for insertion of a joining device, such as a screw or bolt.

The inner support ring 70 may be an integral part of the inner liner 36 or a separate component affixed thereto during assembly.

The bulkhead 34 comprises an outer support ring 84. The outer support ring 84 engages the bulkhead 34 at the second side/edge 73 thereof and the outer liner 38 to form a seal therebetween. The outer support ring 84 is annular, e.g. of radius greater than the inner support ring.

The outer support ring 84 comprises a cooperating mating feature 88. In FIG. 4 this is shown as a cavity/recess formed between a wall of the outer support ring 84 and a wall of the locking ring 98. A corresponding protrusion on the bulkhead 34 extends towards and engages the cavity. The cooperating mating feature 88 may comprise a continuous annular cavity. The cooperating mating feature 88 may comprise a plurality of discrete cavities. The cooperating mating feature 88 may be angled toward the downstream end of the combustor 16. The cooperating mating feature 88 may be angled toward the upstream end of the combustor 16. The cooperating mating feature 88 of the outer support ring 84 may be angled in the radial direction and/or parallel to the plane defined by the body of the bulkhead, this may help permit lateral relative movement of the bulkhead 34 and the outer support ring 88.

In some embodiments, the cooperating mating feature 88 of the outer support ring 88 may comprise a recess/cavity instead of a protrusion, or a combination of recesses and protrusions. The cooperating mating feature 88 of the outer support ring 84 may be continuous around the outer circumference of the outer support ring 84 or it may comprise a plurality of discrete recesses and/or discrete protrusions around the outer circumference of the outer support ring 84.

The protrusion on the bulkhead 34 may only partially occupy the cavity to permit lateral relative movement of the bulkhead 34 and the outer support ring 84. Likewise, in embodiments where the cooperating mating feature 88 is a cavity, a corresponding protrusion of the outer liner may only partially occupy the cavity.

The outer support ring 84 comprises a second mating feature 90 to cooperate with the outer liner 38. In FIG. 4 this is shown as a protrusion. The protrusion extends towards and engages a corresponding cavity 92 on the outer liner 38. The protrusion may comprise a continuous annular ridge. The protrusion may comprise a plurality of discrete protrusions. Alternatively, the second mating feature 90 may comprise a recess/cavity, this may cooperate with a corresponding protrusion on the outer liner 38.

The protrusion 90 may extend perpendicularly to the cavity 88, or else an oblique angle thereto, i.e. offset from perpendicular.

In embodiments where the second mating feature 90 of the outer support ring 84 is a cavity, the inner liner 36 may comprise a protrusion to cooperate with the cavity on the inner support ring 70. In embodiments the outer liner 38 and the outer support ring 84 may both comprise cooperating protrusions and cavities.

The second mating feature 90 of the outer support ring 84 may be axially aligned with the corresponding mating feature of the outer liner 38. This may improve ease of assembly.

The outer support ring 84 comprises at least one joining feature 94. The joining feature 94 extends outward from a centre point of the outer support ring 84 i.e. radially outwards from an outer edge of the outer support ring 84. The joining feature 94 comprises at least one aperture 96 for insertion of a joining device, such as a screw or bolt.

The outer support ring 84 may be an integral part of the outer liner 38 or a separate component affixed thereto during assembly.

The combustion assembly may comprise a locking ring 98. In the embodiment shown in FIG. 4 the locking ring 98 engages the bulkhead 34 at the second side/edge 73 thereof and the outer support ring 84 to form a seal therebetween. The locking ring 98 is annular.

The bulkhead 34 may comprise a groove 100 formed on the outer surface 41 thereof, e.g. towards its outer peripheral edge. The groove 100 may comprise an annular form. The bulkhead may comprise a groove (not shown) on any of the inner radial edge of the outer surface 41, the inner radial edge of the inner surface 40 or the outer radial edge of the inner surface 40. The grooves may abut or face a corresponding portion of the inner support ring 70 or outer support ring 84 to provide a consistent thickness and a seal between the support rings and the bulkhead. The groove may be sized to allow for relative differences of thermal expansion between the bulkhead and support rings.

The locking ring 98 engages the groove 100. The locking ring 98 only partially occupies the groove 100 on the bulkhead 34 to permit lateral relative movement of the locking ring 98 and the bulkhead 34.

The locking ring 98 comprises at least one joining feature 102. The joining feature 102 extends away from a centre point of the locking ring 98. The joining feature 102 comprises at least one aperture for insertion of a joining device, such as a screw or bolt.

The locking ring 98 may comprise a unitary annular form.

A locking ring may alternatively be positioned adjacent to the inner support ring 70 to constrain the bulkhead 34 therebetween.

Alternatively, the locking ring 98 may comprise a plurality of annular segments. The number/shape/orientation of segments of the locking ring 98 may correspond to the segments 60 of the bulkhead. The segments of the locking ring 98 may be configured to overlie at least one seal between adjacent bulkhead segments 60. At least one segment of the locking ring 98 may be configured to overlie a plurality seals between adjacent bulkhead segments 60. Each segment may comprise at least one joining feature 102.

The locking ring 98 may or may not be integral with the cowl 42.

The locking ring 98 may be planar. Alternatively, the locking ring may be conical. The locking ring may be angled toward the upstream direction of the combustor 16. The locking ring may be angled toward the downstream direction of the combustor 16.

The locking ring 98 may be laser cut or waterjet cut from a sheet of material. The locking ring 98 may comprise a metallic material. The metallic material may comprise a Nickel alloy. The metallic material may comprise a high temperature Nickel alloy. The metallic material may comprise a Nickel-based superalloy.

The bulkhead 34 may comprise a low friction coating. The low friction coating may be disposed in areas of the bulkhead 34, or segments thereof, that interface with other components, or segments, of the system. The low friction coating may be disposed on the interface between the bulkhead 34 and the inner support ring 70. The low friction coating may be disposed on the interface between the bulkhead 34 and the outer support ring 84. The low friction coating may be disposed on the interface between the bulkhead 34 and the locking ring 98. The low friction coating may be disposed on the interface between the bulkhead 34 and the fuel spray nozzle seal 46.

The low friction coating may comprise a high temperature low friction material. The low friction coating may comprise graphite, tungsten disulphide or molybdenum disulphide and combinations thereof.

A cowl 42 overlies the outer surface 41 of the bulkhead 34. The cowl 42 may be configured to substantially conform to the outer profile/shape of the bulkhead 34 but is recessed away from the outer surface 41 of the bulkhead 34 to provide a cavity therebetween. The cowl 42 may be annular. The cowl 42 may be dome shaped.

The cowl 42 comprises a plurality of apertures 104 corresponding to the fuel spray nozzles. The apertures 104 are aligned with the apertures 44 provided in the bulkhead 34.

The cowl 42 may comprise a lip. The lip may overlie a portion of the outer support ring 84 and the outer liner 38 to form a seal therebetween. The lip on the cowl may sit radially outwards the of the outer support rings and radially inwards of the inner support ring. The lip may extend in the axial direction to meet the combustor inner and outer liners 36, 38. The lip may be interrupted to accommodate the joining features.

The cowl 42 may comprise an inner and outer portion, the outer portion provided radially outward of the inner portion. The outer portion may be integral to the locking ring 98. The inner portion may integral to the inner support ring 70.

The cowl 42 comprises at least one inner joining feature 114. The joining feature 114 extends towards a centre point of the cowl 42. The joining feature 114 comprises at least one aperture for insertion of a joining device, such as a screw or bolt. The joining features 114 of the cowl 42 may correspond in position to the joining features 80 of the inner support ring 70.

The cowl 42 comprises at least one outer joining feature 112. The joining feature 112 extends towards a centre point of the cowl 42. The joining feature 112 comprises at least one aperture for insertion of a joining device, such as a screw or bolt. The joining features 112 of the cowl 42 may correspond in position to the joining features 94 of the outer support ring 84.

The inner liner 36 and the outer liner 38 may comprise a heat resistant material. The heat resistant material may comprise heat resistant tiles. The heat resistant material may comprise a plurality of cooling channels.

The inner liner 36 and/or the outer liner 38 may be formed from a plurality of arcuate segments.

The inner liner 36 and the outer liner 38 comprise at least one air inlet.

The inner liner 36 comprises at least one joining feature 108. The joining feature 108 extends towards a centre point of the inner liner 36. The joining feature 108 comprises at least one aperture for insertion of a joining device, such as a screw or bolt. The joining features 108 of the inner liner 36 may correspond in position to the joining features 80 of the inner support ring 70.

The outer liner 38 comprises at least one joining feature 110. The joining feature 110 extends towards a centre point of the outer liner 36. The joining feature 110 comprises at least one aperture for insertion of a joining device, such as a screw or bolt. The joining features 110 of the outer liner 38 may correspond in position to the joining features 94 of the outer support ring 84.

The assembly of the bulkhead will now be described with reference to FIGS. 7-10.

The bulkhead segments 60 are arranged around the inner support ring 70. The recess 74 formed on the first end 71 of the bulkhead 34 is located onto the protrusion 72 formed on the inner ring. Each segment 60 is sealed to an adjacent segment 60 by placing the seals 62 into the grooves 66 on the edges of the segments 60. Where the seals 62 are formed integrally to the bulkhead 34, the segments 60 are merely placed adjacent to one another. This may be completed using a tooling configured to support each segment 60 (e.g. through the fuel spray nozzle aperture 44) and pull each segment 60 toward the inner support ring 70 simultaneously. Temporary fixtures may be used to secure the segments onto the inner support ring. The temporary fixtures may engage the apertures 44 provided on the bulkhead 34 and the inner support ring 70.

In embodiments where the mating features are reversed from those described herein (e.g. a cavity in place of a protrusion and vice versa), the assembly follows essentially the same procedure.

The bulkhead 34 and inner support ring 70 are located onto the inner liner 36. The protrusion located on the inner support ring 70 is located into the cavity 78 provided on the inner liner 36. This may be performed by vertically lowering the bulkhead 34 onto the inner liner 36.

The outer ring support 84 is located onto the outer liner 38. The outer ring support 84 and the outer liner 38 may be temporarily secured together via the respective joining features 94, 110.

The bulkhead 34, inner support ring 70 and inner liner 36 are located into the outer liner 38. The inner face 40 of the first end 73 of the bulkhead 34 engages the cavity 88 formed in the outer support ring 84. This may be performed by vertically lowering the bulkhead, inner support ring 70 and inner liner 36 onto the outer liner 38.

The locking ring 98 is located onto the groove 100 formed on the first end 73 of the bulkhead 34. The joining feature 102 of the of the locking ring 98 is aligned with the joining features 94, 110 of the outer support ring 84 and the outer liner 38 respectively.

In embodiments comprising an inner locking ring, the inner locking ring may be located and joined to the inner support ring 70 after the bulkhead segments have been arranged on the inner support ring 70.

The cowl 42 is located onto the onto the bulkhead 34. The outer joining features 112 of the cowl 42 are aligned with the joining features 102, 94, 110 of the locking ring 98, the outer support ring 84 and the outer liner 38 respectively. At least one fastener is fixed through the joining features. The fastener may be a bolt or screw.

The inner joining features 114 of the cowl 42 are aligned with the joining features 80, 108 of the inner support ring 70, the outer support ring 84 and the inner liner 36 respectively. At least one fastener is fixed through the joining features. The fastener may be a bolt or screw.

The locking ring 98 may be secured to the outer liner 38 by welding. The cowl 42 may be secured to the outer liner 38 and/or the inner liner by welding.

The bulkhead 34 may be used in any combustion apparatus. The combustor apparatus may comprise part of a combustor or may comprise a combustor in its entirety. The bulkhead 34 may be used in a gas turbine engine. The combustor apparatus may be used in a geared gas turbine engine. The combustor apparatus may be used in a turboprop engine. The combustor apparatus may be used in a turbojet engine.

Whilst specific examples of the assembly process and fastenings are described above, it is to be noted that other conventional fastenings or assembly processes could be used as would be understood by the person skilled in this technical field The combustor assembly may provide improved high temperature requirements.

The combustor assembly may reduce the weight of the combustor system. In particular it obviates the need to use studs and nuts to combine separate various parts, e.g. separate heatshield and metering panels.

The combustor assembly may reduce the cost of manufacture of the combustor system.

The combustor assembly may reduce the complexity of manufacturing of the apparatus and/or process.

The combustor assembly may provide an integral cooling system.

The combustor assembly may permit replacement of individual bulkhead segments.

The combustor assembly may provide axial constraint of the individual bulkhead segments.

The combustor assembly may allow easier redesign of the mechanical/thermal properties of the bulkhead.

The combustor assembly may prevent the seizure or damage of the fastening elements.

The combustor assembly may allow for thermal expansion and contraction of the bulkhead relative to the inner/outer liners and support rings.

The combustor assembly may allow different materials to be used and allow for material isolation between mating features of two different material. For example, the bulkhead may be formed from CMC and the support rings from a metallic material e.g. a nickel alloy. A barrier layer such as a polymeric layer may be placed between the mating features to prevent corrosion or any diffusion of charged particles between materials.

The bulkhead is manufacturable by additive manufacture independent of combustor diameter. This is because bulkhead segment size can be chosen to fit in the build table of an additive manufacturing machine.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A combustor apparatus for a gas turbine engine, the combustor apparatus comprising:

an inner support ring including a first mating protrusion extending axially inward;

outer support ring including a second mating protrusion extending axially inward;

an inner liner connected to the inner support ring by the first mating protrusion, the first mating protrusion extending axially inward into a corresponding recess of the inner liner in an axial direction of the combustor apparatus;

an outer liner connected to the outer support ring by the second mating protrusion, the second mating protrusion extending into a corresponding recess of the outer liner in the axial direction; and a bulkhead at an upstream end of the combustor apparatus, the bulkhead including:
- an inner surface exposed to combustion products and provided on an internal surface of a combustor in use;
- an outer surface provided on an external surface of the combustor in use;
- a metering panel formed in the bulkhead by the inner surface and the outer surface, the metering panel including a plurality of apertures, the metering panel having a heat shield coating applied to the metering panel and around the plurality of apertures;
- an inner mating feature that cooperates with the inner support ring; and
- an outer mating feature that cooperates with the outer support ring, and in use, the inner mating feature and the outer mating feature prevent axial motion of the bulkhead relative to the inner support ring and the outer support ring.

2. The combustor apparatus as claimed in claim 1, wherein the inner surface and the outer surface of the bulkhead are either or both of integrally and monolithically formed as opposing surfaces of a single wall structure.

3. The combustor apparatus as claimed in claim 1, wherein either or both of the inner mating feature and the outer mating feature is configured to permit radial expansion or contraction of the bulkhead and prevent axial movement.

4. The combustor apparatus as claimed in claim 1, wherein either or both of the inner mating feature and the outer mating feature is aligned in a radial direction.

5. The combustor apparatus as claimed in claim 1, wherein the inner support ring includes a cooperating mating feature to cooperate with the inner mating feature of the bulkhead.

6. The combustor apparatus as claimed in claim 1, wherein the outer support ring includes a cooperating mating feature to cooperate with the outer mating feature of the bulkhead.

7. The combustor apparatus as claimed in claim 6, further comprising a lock ring,
wherein the cooperating mating feature of either or both of the inner support ring and the outer support ring includes a first wall, and in use, the first wall combines with a wall of the lock ring to form a recess.

8. The combustor apparatus as claimed in claim 1, wherein either or both of the inner mating feature and the outer mating feature includes at least one of a projection, a recess, or a wall, extending in a radial direction.

9. The combustor apparatus as claimed in claim 1, wherein the bulkhead includes a fuel spray nozzle seal provided within at least one of the plurality of apertures.

10. The combustor apparatus as claimed in claim 9, wherein the fuel spray nozzle seal depends from either or both of the inner surface and the outer surface of the bulkhead.

11. The combustor apparatus as claimed in claim 1, wherein the bulkhead includes a nickel alloy.

12. The combustor apparatus as claimed in claim 1, wherein the bulkhead is formed by an additive layer manufacturing process.

13. The combustor apparatus as claimed in claim 1, wherein the bulkhead includes a ceramic matrix composite.

14. The combustor apparatus as claimed in claim 1, wherein the bulkhead includes a plurality of adjacent segments each having an inner surface portion and an outer surface portion, the plurality of adjacent segments being aligned such that the inner surface portion and the outer surface portion collectively define the inner surface and the outer surface of the bulkhead.

15. The combustor apparatus as claimed in claim 14, wherein the plurality of adjacent segments are either or both of aligned in a common plane and arranged to form an annular ring.

16. A gas turbine engine comprising the combustor apparatus as claimed in claim 1.

17. A method of manufacturing the combustor apparatus as claimed in claim 1, the method comprising using an additive layer manufacturing process to manufacture the bulkhead of the combustor apparatus as claimed in claim 1.

* * * * *